June 17, 1958 B. KAZAN 2,839,690

CIRCUIT FOR ENERGIZING LIGHT AMPLIFIER DEVICES

Filed Nov. 17, 1955

INVENTOR.
BENJAMIN KAZAN
BY
ATTORNEY 2,839,690

CIRCUIT FOR ENERGIZING LIGHT AMPLIFIER DEVICES

Benjamin Kazan, Princeton, N. J., assignor to Radio Corporation of America, a corporation of Delaware Application November 17, 1955, Serial No. 547,411

5 Claims. (Cl. 250—213)

The present invention relates generally to apparatus for reproducing light images and particularly to circuit means for energizing electroluminescent or light amplifier devices.

Electric energy may be converted into light in devices utilizing the property of electroluminescence. Devices of this type will provide light amplification. In a particular type of such device an electric field is applied across the combination of a photoconductive layer in juxtaposition or in close association with an electroluminescent layer. The photoconductive layer is illuminated or irradiated by modulated radiant energy under the control of a picture signal to provide across elemental portions of the electroluminescent layer a field which varies in intensity in accordance with the modulating signal.

Known electroluminescent materials generally require an alternating field for their proper operation. In order to satisfy this requirement it is customary to energize electroluminescent devices with alternating voltages. However, it has been found that photoconductive powder materials are more sensitive to incident radiation when energized by unidirectional fields of constant or varying magnitudes than when energized by alternating fields.

It is accordingly an object of the present invention to provide an improved circuit means for energizing an electroluminescent device to provide increased light amplifier gain.

It is another object of the present invention to provide an energizing means for an electroluminescent device wherein the individual materials of the device are selectively energized or excited to provide improved light amplifier gain.

It is a further object of the present invention to provide an improved energizing means for an electroluminescent device whereby each layer of the device is energized or excited by electrical energy of the type most suited to the material of that layer.

In accordance with the present invention an electroluminescent device is energized by applying an alternating voltage of opposite phase or an alternating voltage with opposite direct voltage bias to alternate conducting lines on the photoconducting layer of an electroluminescent device. This may be accomplished by means of unilaterally conducting devices to provide the opposite phase or fixed direct voltage bias of opposite polarity each connected between the power source and alternate lines on the photoconductive layer.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
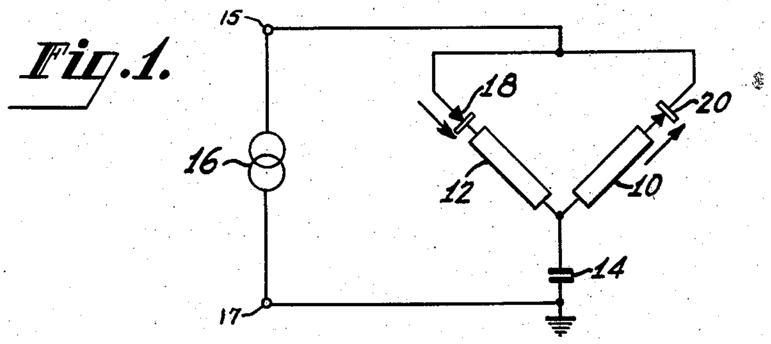
Figure 1 is a schematic diagram illustrating one form of a circuit for energizing an electroluminescent device in accordance with the present invention.

Referring now to Figure 1 in detail, an electroluminescent device or light amplifier is schematically illustrated as a pair of photoconductive elements 10 and 12 and an electroluminescent element 14 connected in a series parallel arrangement. The free ends of the photoconductive elements 10 and 12 are respectively connected to one terminal 15 of a source of alternating current energizing voltage 16 by means of oppositely poled unilaterally conducting elements illustrated as a pair of diodes 18 and 20. The other terminal 17 of the voltage source 16 is connected to the free end of the electroluminescent element 14.

With such a circuit arrangement, the alternating voltage applied from the source 16 is effective to cause a current flow through the photoconductive element 12 in a direction as determined by the polarity of the diode 18 and through the photoconductive element 10 in a direction as determined by the polarity of the diode element 20. Therefore, each of the photoconductive elements 10 and 12 is energized by a direct or pulsating current rather than by an alternating current. Moreover, the field which is applied across the electroluminescent element 14 is of an alternating variety and is applied alternately through the photoconductive element 10 and the photoconductive element 12 depending upon the degree illumination of these elements and the instantaneous polarity of the voltage source 16.

Since it has been determined that photoconductive powders such as cadmium sulfide are approximately 10 times more sensitive to incident light when energized by means of direct or pulsating fields compared to their sensitivity when energized by alternating fields, the sensitivity of the electroluminescent device when energized in accordance with the circuit shown in Figure 1 is greatly improved over that provided by the mere application of an alternating voltage across the two layers in series.

Figure 2:
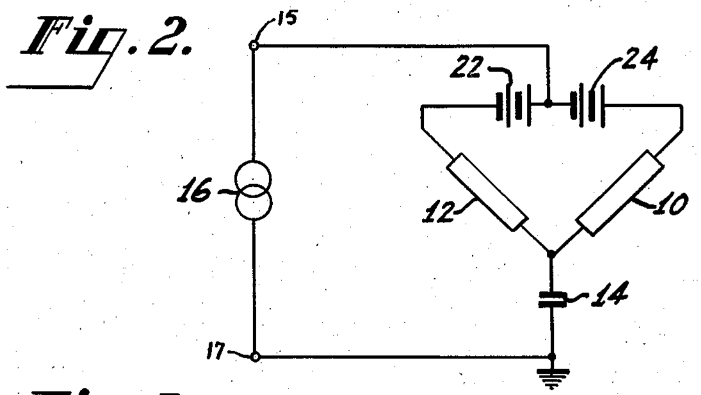
Figure 2 is a schematic diagram illustrating another form of a circuit for energizing an electroluminescent device in accordance with the present invention.

The unidirectional field for energizing the photoconductive material may also be provided by means of a direct current biasing arrangement as shown in Figure 2 wherein like elements have been indicated by the same reference numerals as used in Figure 1 and wherein the diode elements 18 and 20 have been respectively replaced by a pair of unidirectional voltage sources illustrated as batteries 22 and 24. It is of course, to be understood that the unidirectional voltage may be obtained from any convenient source. With the arrangement as shown in Figure 2 a pulsating unidirectional field is applied across the photoconductive elements 10 and 12 in a direction determined by the polarity of the batteries 22 and 24 and of a magnitude determined by the voltage provided by these batteries, the magnitude and polarity of the voltage from the source 16. The field which is applied across the electroluminescent element 14, however, is of an alternating current variety as provided by the alternating voltage source 16 and a magnitude as determined by the instantaneous impedance provided by the photoconductive elements 10 and 12. Consequently the photoconductive elements 10 and 12 are appropriately energized by a unidirectional field to provide maximum sensitivity for the electroluminescent device and the electroluminescent element 14 is energized by means of an alternating field to provide proper operation of this portion of the device. Maximum sensitivity with a minimum of circuit element is therefore provided in accordance with the present invention.

Figure 3:
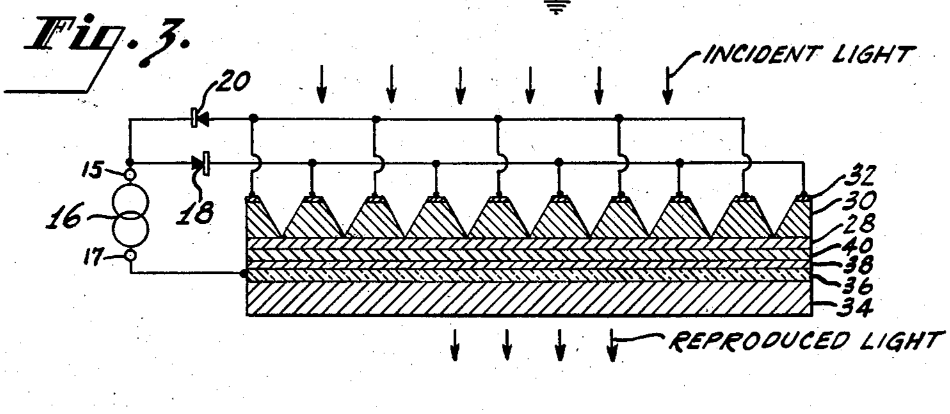
Figure 3 is a schematic diagram showing a cross-section of an electroluminescent device and a circuit for energizing the electroluminescent device in accordance with the present invention.

In order to energize an electroluminescent device in accordance with the present invention it is necessary to provide a structure which includes a photoconductive layer having grooves, lines or striations capable of individual electric connection to an energizing source. One such form of a structure is illustrated in Figure 3 which comprises a corrugated layer 30 of photoconductive material having ridges coated with a conductive layer 32 such as silver paint. The photoconductive layer may be formed by coating a support plate with a uniformly thick layer of photoconductive material of a desired thickness followed by a layer of silver paint of a desired thickness. The cell is then machined by grinding or milling for example, to remove portions of the material and leave grooves for permitting light to penetrate and excite the photoconductive material along its entire depth. Leads are connected to the individual coated ridges 32 for applying operating voltages. Another alternative is to mold the grooves from a plastic mold applied to the support plate and then coat the ridges of the grooved photoconductive layer with silver paint.

The remaining elements of the electroluminescent device comprise a transparent support member or glass plate 34, a transparent conductive film 36 which may be a film of tin chloride, for example, a layer of electroluminescent material 38, and a current diffusing layer 28. If desired, a light opaque insulating layer 40 may be interposed between the photoconductive layer 30 and the electroluminescent layer 38. Alternate ones of the conductive elements on the ridges of the photoconductive layer 30 are connected together and connected to one terminal 15 of the source of the voltage 16 through the diode elements 18 and 20. The other terminal 17 of the voltage source 16 is connected to the transparent conductive film 36.

The maximum width of the grooves should not exceed the width of a picture element and preferably should be appropriately smaller in order to preserve picture resolution. The electroluminescent material may be constituted of particles of electroluminescent phosphor imbedded in a dielectric and having the property of emitting light under the influence of an electric field. It may comprise zinc sulfide activated with copper and mixed with a suitable plastic such as ethyl cellulose.

One function of the current diffusing layer 28 is to diffuse the current from each point of the groove bottoms of the photoconductive layer 30 to the corresponding areas on the surface of the electroluminescent layer 38. The material of the current diffusing layer may comprise cadmium sulfide which has been made conducting by first adding cadmium chloride and then heating the mixture to about 700° C. for 20 minutes. The impedance of the current diffusing layer compared to the impedance of the illuminated photoconductive layer and that the electroluminescent layer should be low.

In the operation of this device, the relative thickness of the photoconductive layer 30 and of the electroluminescent layer 38 are adjusted so that the series impedance of the photoconductive layer 30 in the dark or in an unexcited condition is in the order of 10 times that of the electroluminescent layer 38. Since these layers are in series with the supply voltage source 16 the voltage appearing across the photoconducting layer 30 is approximately 10 times the voltage appearing across the electroluminescent layer 38. The supply voltage is adjusted so that the magnitude of the voltage in the dark appearing across the electroluminescent layer 38 is below the threshold value required to cause visible luminescence of the phosphor in the electroluminescent layer. Under these conditions with no incident radiation on the photoconductive layer 30, no light is emitted from the electroluminescent layer 38.

Under these conditions, light falling upon an elemental area of the photoconductive layer, for example, the surface between two adjacent ones of the conductive elements 32 increases the conductivity of the irradiated photoconductive material in this area providing conductive paths adjacent to the exposed surfaces between the conductors 32 and the current diffusing layer 28. This increase in conductivity or drop in impedance of the photoconductive layer which is a function of the intensity of the incident light, causes a corresponding increase in the voltage appearing across the adjacent portion of the electroluminescent layer 38, thereby providing a field of sufficient magnitude to energize the electroluminescent material. The electroluminescent material is thus caused to emit light in this area. Because the intensity of the light emitted from the electroluminescent material increases with increasing field developed across it, an image with halftone value can be reproduced on the electroluminescent layer surface which is a replica of the image incident on the photoconductive layer.

Moreover, in accordance with the present invention the field which is applied to the elemental areas of the photoconductive layer 30 is in this instance of a pulsating variety provided by the action of the diode elements 18 and 20. That is, alternate ridges will be subjected to unidirectional fields of varying amplitude and of opposite direction depending on whether or not the energizing voltage is applied through the diode element 18 or the diode element 20 and the current through each will be determined by the amount of incident radiation. The field applied across the electroluminescent layer 38 is however, of an alternating variety as provided by the voltage source 16 and applied alternately by means of the diode elements 18 and 20.

The energizing circuit provided in accordance with the present invention therefore enables efficient operation of the combination of photoconductive and electroluminescent materials arranged as adjacent layers in an electroluminescent device wherein the photoconductive layer is energized or excited by a unidirectional field for maximum efficiency and the electroluminescent layer is energized by means of an alternating field.

What is claimed is:

1. Apparatus for reproducing radiant energy images having a plurality of intensity gradations including an electroluminescent body which contains a layer which luminesces in response to applied electrical field and a photoconductive body coupled to said electroluminescent body, said photoconductive body including a plurality of individual electrical contacts, means for applying an electric field to said bodies in series, said field being applied in one polarity to alternate contacts and of opposite polarity to intermediate contacts for providing a unilateral field across elemental areas of said photoconductive body and an alternating field across said electroluminescent body.

2. A light amplifier comprising in combination, an electroluminescent device including an array of adjacent elements of a material having a variable impedance characteristic in response to radiant energy excitation, an electroluminescent layer adjacent to said array on one side thereof, a conductive member coextensive with said electroluminescent layer, said electroluminescent layer being supported between said conductive member and said elements whereby said elements and said electroluminescent layer are electrically in series, and means for applying an alternating voltage of one phase between said conductive member and alternate elements of said array and of opposite phase between said conductive member and intermediate elements of said array for applying a unidirectional field across individual elements and an alternating field across said electroluminescent layer.

3. A light amplifier comprising in combination, an electroluminescent device including an array of adjacent elements of a material having a variable impedance characteristic in response to radiant energy excitation, an electroluminescent layer adjacent to said array on one side thereof, first means providing electrical contact with alternate elements on the other side of said array and including a first unilaterally conducting device poled in a predetermined direction, second means for providing electrical contact with intermediate ones of said elements and including a second unilaterally conducting device poled in a direction opposite to said predetermined direction, a conductive member coextensive with said electroluminescent layer, said electroluminescent layer being supported between said conductive member and said elements whereby said elements and said electroluminescent layer are electrically in series and an alternating voltage supply means connected between said conductive member and said unilaterally conducting devices for applying a unidirectional field to said elements and an alternating field to said electroluminescent layer.

4. A light amplifier comprising in combination, an electroluminescent device including an array of adjacent elements of a material having a variable impedance characteristic in response to radiant energy excitation, an electroluminescent layer adjacent to said array on one side thereof, means providing individual electrical contact with adjacent elements on the other side of said array, a conductive member coextensive with said electroluminescent layer, said electroluminescent layer being supported between said conductive member and said element whereby said elements and said electroluminescent layer are electrically in series, a first source of direct current voltage connected in a predetermined polarity by said electrical contact means to alternate ones of said adjacent elements, a second source of direct current voltage connected in a polarity opposite to that of said first source by said electrical contact means to intermediate ones of said adjacent elements, and a source of alternating voltage connected between said conductive member and said direct current voltage source whereby an alternating field is applied across said electroluminescent layer and a unidirectional field is applied to said elements.

5. A light amplifier comprising in combination, an electroluminescent device including an array of adjacent elements of a material having a variable impedance characteristic in response to radiant energy excitation, an electroluminescent layer adjacent to said array on one side thereof, a conductive member coextensive with said electroluminescent layer, said electroluminescent layer being supported between said conductive member and said elements whereby said elements and said electroluminescent layer are electrically in series, a source of alternating voltage, means for applying one polarity of said alternating voltage between alternate elements of said array and said conductive member and the opposite polarity of said alternating voltage between intermediate elements of said array and said conductive member for applying a unidirectional field across individual elements of said array and an alternating field across said electroluminescent layer.

References Cited in the file of this patent

UNITED STATES PATENTS

| | | |
|---|---|---|
| 2,728,021 | Blanks | Dec. 20, 1955 |
| 2,764,693 | Jacobs | Sept. 25, 1956 |